(12) United States Patent
Naito

(10) Patent No.: US 6,427,043 B1
(45) Date of Patent: Jul. 30, 2002

(54) WAVELENGTH DISPERSION COMPENSATING METHOD AND OPTICAL TRANSMISSION SYSTEM

(75) Inventor: Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 09/639,766

(22) Filed: Aug. 15, 2000

(30) Foreign Application Priority Data

Sep. 24, 1999 (JP) .............................. 11-270605

(51) Int. Cl.[7] .............................. G02B 6/02; H04J 14/00
(52) U.S. Cl. .......................... 385/123; 385/31; 385/38; 359/115; 359/124; 359/161; 359/173; 359/188; 359/333
(58) Field of Search ................................ 385/123, 122, 385/147, 1, 2, 3, 31, 38; 359/115, 124, 161, 173, 188, 341, 333

(56) References Cited

U.S. PATENT DOCUMENTS

| | | | | |
|---|---|---|---|---|
| 5,400,165 A | * | 3/1995 | Gnauck et al. | ............. 319/161 |
| 5,633,885 A | * | 5/1997 | Galvanauskas et al. | ........ 372/25 |
| 5,877,881 A | * | 3/1999 | Miyauchi et al. | ............ 359/161 |
| 5,886,804 A | * | 3/1999 | Onaka et al. | ................ 359/161 |
| 5,923,683 A | * | 7/1999 | Morioka et al. | ................ 372/6 |
| 5,926,297 A | * | 7/1999 | Ishikawa et al. | ............ 359/115 |
| 6,023,360 A | * | 2/2000 | Morioka et al. | ............ 359/123 |

OTHER PUBLICATIONS

N.S. Bergano, et al., "Wavelength Division Multiplexing in Long–Haul Transmission Systems", Journal of Wavelength Technology, vol. 14, No. 6, Jun. 1996.
M. Murakami, et al., Long–Haul 16×10 WDM Transmission Experiment Using Higher Order Fiber Dispersion Management Technique, ECOC '98, Sep. 20–24, 1998, Madrid, Spain.

* cited by examiner

*Primary Examiner*—Brian Healy
(74) *Attorney, Agent, or Firm*—Staas & Halsey LLP

(57) ABSTRACT

There are provided a wavelength dispersion compensating method of reducing distortion of a transmitted waveform due to cross phase modulation in an optical transmission path, and an optical transmission system utilizing the method. To this end, the wavelength dispersion compensating method of the present invention sets the wavelength dispersion characteristic of the optical transmission path such that the time delay amount to occur between light signals of adjacent two wavelengths due to wavelength dispersion such as in one repeating section in the transmission path, to become ½ times of a bit interval, for the optical transmission path having transmission loss. In this way, one of the light pulses of adjacent two wavelengths is delayed from the other by 1 bit after the transmission of two transmission sections, so that the red chirping to occur in a first repeating section and the blue chirping to occur in a second repeating section offset to each other, resulting in reduction of waveform distortion caused by cross phase modulation.

14 Claims, 11 Drawing Sheets

CALCULATION MODEL OF ISOLATED LIGHT PULSE

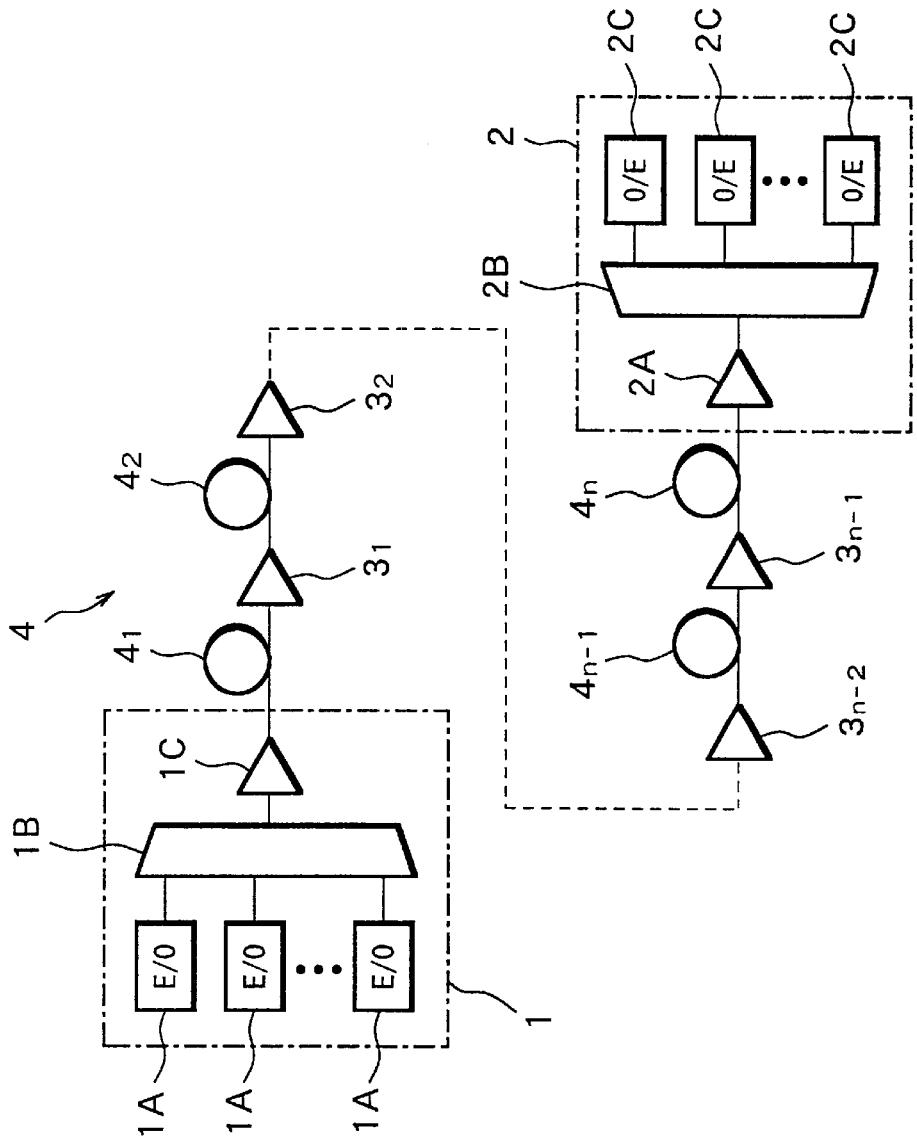

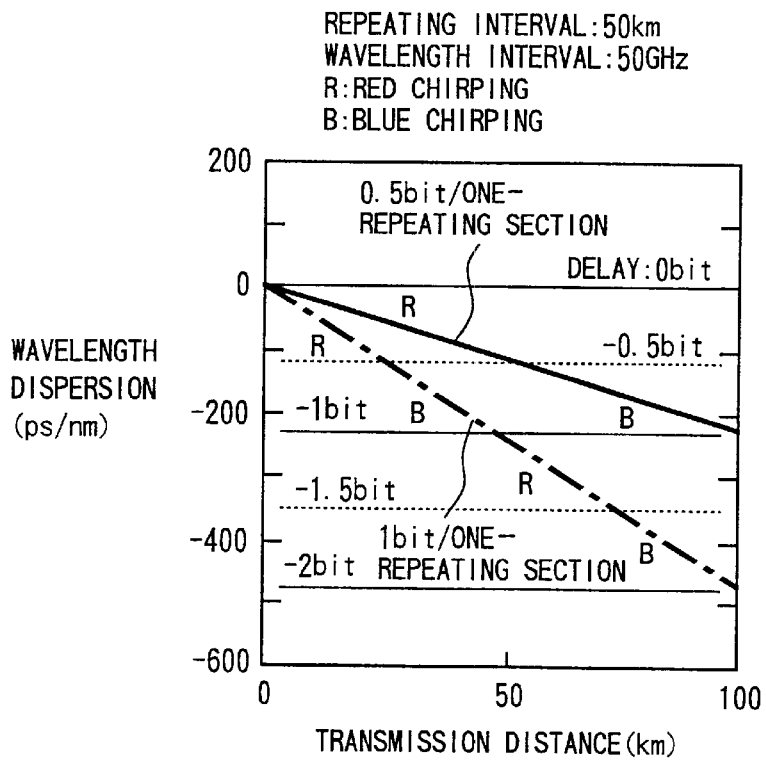
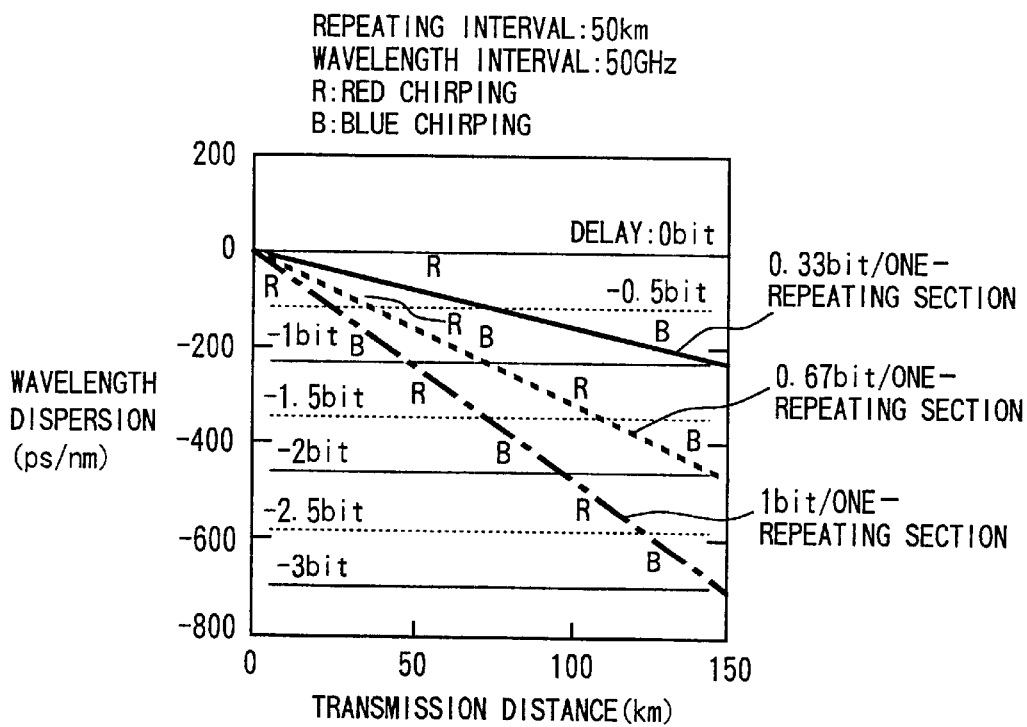

SELF PHASE MODULATION

EXAMPLE OF TRANSMISSION OF TWO ISOLATED PULSES

CROSS PHASE MODULATION
(STATE IN WHICH SECOND SIGNAL LIGHT HAS APPROACHED
AND STARTED COLLIDING WITH FIRST SIGNAL LIGHT)

CROSS PHASE MODULATION
(STATE IN WHICH SECOND SIGNAL LIGHT HAS GOTTEN AHEAD OF
FIRST SIGNAL LIGHT AND IS ABOUT TO LEAVE FIRST SIGNAL LIGHT)

WAVELENGTH DISPERSION COMPENSATING METHOD AND OPTICAL TRANSMISSION SYSTEM

BACKGROUND OF THE INVENTION

1. Field of the Invention

The present invention relates to a method for compensating for wavelength dispersions caused when transmitting wavelength division multiplexed signal light using an optical transmission path having a plurality of repeating sections, and an optical transmission system adopting such a method, and particularly to a method for compensating for wavelength dispersions and an optical transmission system capable of reducing affections of cross phase modulation caused among optical signals of respective wavelengths.

2. Related Art

Conventionally, in an optical transmission system over a long distance, an optical signal has been transmitted making use of an optical regenerating repeater which converts an optical signal into an electrical signal, to thereby perform retiming, reshaping and regenerating. However, at present, the advancement of practical use of an optical amplifier has led to the investigation of an optical amplifying-and-repeating transmission system which utilizes an optical amplifier as a linear repeater. By replacing an optical regenerating repeater with an optical amplifying-repeater, it is expected that the number of parts within the repeater is remarkably reduced, to thereby ensure reliability and to permit cost reduction. Further, as one method for realizing a large capacity of an optical transmission system, attention has been directed to a wavelength division multiplexing (WDM) optical transmission system which multiplexes two or more optical signals having wavelengths different from each other to transmit in a single optical transmission path. In a WDM optical amplifying-and-repeating transmission system provided by combining the aforementioned optical amplifying-and-repeating transmission system with the WDM optical transmission system, it is possible to collectively amplify WDM signal lights by an optical amplifier, to thereby permit realization of a lager capacity and a long distance transmission with a simple constitution (economical advantage).

In a conventional WDM optical amplifying-and-repeating transmission system, the cause of waveform distortion due to a nonlinear effect of optical transmission path includes self phase modulation (SPM), cross phase modulation (XPM), and four wave mixing (FWM). To reduce transmission characteristic degradation due to the nonlinear effect of optical transmission path, there is used a method for managing a wavelength dispersion of an optical transmission path.

For example, in an article of N. S. Bergano et al., "Wavelength division Multiplexing in Long-Haul Transmission Systems, IEEE Journal of Lightwave Technology, vol. 14, no. 6, pp. 1299–1308, 1996", there is used an optical transmission path combining a dispersion-shifted fiber (DSF) having a length of about 900 km and having a zero-dispersion wavelength of 1,585 nm with a single-mode fiber (SMF) having a length of about 100 km and having a zero-dispersion wavelength of 1,310 nm. This optical transmission path has an averaged zero-dispersion wavelength of about 1,558 nm, and accommodates wavelengths of signal lights ranging from 1,556 nm to 1,560 nm. The distortion of a transmitted waveform such as due to four wave mixing can be mitigated, because the wavelength dispersion of the DSF is about −2 ps/nm/km, in which a group velocity of signal lights and spontaneous emission light and a group of mutual signal lights are different from each other so that an interaction period of time of nonlinear effect can be shortened.

Further, to realize a WDM optical transmission system having a more larger capacity and for a longer distance, the main subjects required for an optical transmission path of the system includes: (a) lower transmission loss; (b) a larger size of nonlinear effective cross section; (c) inconsistency of the zero-dispersion wavelength of signal light with that of the optical transmission path; (d) a relatively small absolute value of an accumulated wavelength dispersion; (e) substantially longer compensation intervals for the accumulated wavelength dispersion, as compared with repeating intervals; and (f) a smaller wavelength dispersion slope or an ability of compensating for the wavelength dispersion slope.

As a countermeasure for the aforementioned subjects, it has been proposed to use, as an optical transmission path, a combination of a 1.3 μm zero dispersion fiber having a positive wavelength dispersion with a dispersion compensation fiber having a negative wavelength dispersion.

For example, in the system such as proposed in an article of M. Murakami et al, "Long-haul 16×10 WDM transmission experiment using high order fiber dispersion management technique, ECOC '98, p. 313, 1998", there are adopted a 1.3 μm zero dispersion fiber having a positive wavelength dispersion and a dispersion compensation fiber having a negative wavelength dispersion, at the former half and the latter half of a transmission section, respectively. The optical fiber at the latter half is capable of compensating for the wavelength dispersion and dispersion slope of the optical fiber at the former half, the nonlinear effective cross section of the optical fiber at the former half is as large as about 80 μm², and the transmission loss of the transmission section is as small as about 0.20 dB/km. Thus, the accumulated wavelength dispersion included in the signal lights of all wavelengths can be sufficiently reduced, so that distortion of transmitted waveform due to self phase modulation-group velocity dispersion (SPM-GVD) can be reduced.

Meantime, when it is possible to reduce the distortion of transmitted waveform due to occurrence of self phase modulation and four wave mixing in case of adopting the aforementioned known type of optical transmission path, it is very possible that cross phase modulation becomes the dominant cause of transmitted waveform distortion due to a nonlinear effect of the optical transmission path. Namely, in an optical transmission path capable of compensating for the wavelength dispersion and its slope at particular intervals, the time-wise arrangement of WDM signal lights is restored at each dispersion compensating intervals, resulting in a possibility of larger waveform distortion due to cross phase modulation.

However, substantially no proposals have been done for conducting wavelength dispersion management taking notice of cross phase modulation, to thereby reduce the degradation of transmission characteristics due to a nonlinear effect of optical transmission path.

There will be briefly explained hereinafter the occurrence of transmitted waveform distortion due to cross phase modulation.

Generally, cross phase modulation is a phenomenon in which intensity fluctuation of another signal light is transformed into phase fluctuation of a pertinent signal light, due to a nonlinear effect of an optical transmission path. Intensity fluctuation of light transmitted through an optical fiber leads to a slight change of a refractive index of the optical fiber, due to a Kerr effect attributing to the optical fiber. The velocity of propagated light changes in accordance with the refractive index change, resulting in occurrence of phase fluctuation of the propagated light itself.

FIG. 15 is a view for explaining phase fluctuation due to self phase modulation and cross phase modulation, respectively. To simplify the explanation, it is assumed that an isolated light pulse is transmitted.

Firstly, for the phase fluctuation due to self phase modulation as shown in FIG. 15A, the light intensity of the isolated light pulse rapidly increases at the leading edge portion of the pulse, leading to occurrence of red shift due to the Kerr effect. This red shift is a phenomenon in which the wavelength of the signal light shifts toward a longer wavelength side, i.e., into a direction where the light frequency is reduced. The red shift is also called "red chirping". Contrary, the light intensity of the isolated light pulse rapidly decreases at the falling edge portion, leading to occurrence of blue shift due to the Kerr effect. This blue shift is a phenomenon in which the wavelength of the signal light shifts toward a shorter wavelength side, i.e., into a direction where the light frequency is increased. The blue shift is also called "blue chirping".

Next, for the phase fluctuation due to cross phase modulation, as shown in FIG. 15B, it is assumed that two signal lights (isolated light pulses) exist and the second signal light pulse is about to get ahead of the first signal light pulse. The reason why this situation is supposed is that, the propagation velocities of respective signal lights become different from each other due to the wavelength dispersion characteristics of an optical transmission path, if the wavelengths of the two signal lights are different from each other. As shown in FIG. 15C, in a state where the second signal light came close to the first signal light and has started colliding with the same, the light intensity is rapidly increased so that red chirping occurs. Further, as shown in FIG. 15D, in a state where the second signal light has gotten ahead of the first signal light and is about to leave the same, the light intensity is rapidly reduced so that blue chirping occurs.

If the power of the second signal light is constant while the second signal light has started getting ahead of the first signal light and has gotten ahead of the same, the red chirping and blue chirping due to the cross phase modulation will offset to each other. Actually, however, when, for example, the loss in an optical transmission path is to be compensated for making use of such as an optical amplifying-repeater, the signal light power frequently changes on the way of transmission. In such a case, red chirping and blue chirping may not offset to each other and either one of them may be left, depending on whether the collision of two light pulses occur in the higher light power state (such as just after the output of an optical amplifying-repeater or in the former half of a repeating section) or in the lower light power state (such as just before the input of an optical amplifying-repeater or in the latter half of a repeating section).

SUMMARY OF THE INVENTION

The present invention has been carried out in view of the conventional problems as described above, and it is therefore an object of the present invention to provide a wavelength dispersion compensating method for reducing the distortion of a transmitted waveform due to cross phase modulation which is one of the nonlinear effects attributing to an optical transmission path, as well as an optical transmission system using such a method.

To achieve the above object, according to one aspect of the present invention, a wavelength dispersion compensating method of a transmission path for transmitting wavelength division multiplexed signal light including two or more optical signals of different wavelengths, comprises the steps of dividing the transmission path into a plurality of repeating sections, and setting the amount or amounts of wavelength dispersion in one repeating section or multiple repeating sections in the transmission path, to be such a value or values that the amount of blue chirping and the amount of red chirping due to cross phase modulation to occur at least between light signals of adjacent two wavelengths substantially offset to each other.

According to such a compensating method, when the wavelength division multiplexed signal light is transmitted through one or multiple predetermined multiple repeating sections, time delays matching with one bit interval are caused between optical signals of respective wavelengths such that the red chirping and blue chirping due to cross phase modulation to occur upon collisions of light pulses are to substantially offset to each other. In this way, it becomes possible to reduce transmitted waveform distortion to be caused by cross phase modulation resulted from collision of light signals of adjacent two wavelengths.

Further, for the dispersion compensating method, the compensation of wavelength dispersion may be conducted such that blue chirping and red chirping occur once, respectively, in multiple repeating sections in the transmission path.

The transmission path attenuates light corresponding to a transmission distance of the light, optical amplifiers for amplifying the light attenuated in the transmission path are provided between the respective repeating sections, and the compensation of wavelength dispersion may be conducted such that the amount of blue chirping and the amount of red chirping due to cross phase modulation to occur between light signals of adjacent two wavelengths offset to each other, in multiple repeating sections in the transmission path. Further, when the amount of blue chirping and the amount of red chirping due to cross phase modulation to occur between light signals of adjacent two wavelengths are set to offset to each other in one repeating section in the transmission path, the compensation of wavelength dispersion may be conducted such that a plurality of cycles of occurrence of blue chirping and red chirping are provided.

Alternatively, the transmission path itself is capable of distributively amplifying the light being transmitted therethrough along a longitudinal direction thereof, so as to avoid the attenuation of light corresponding to a transmission distance thereof, and when the amount of blue chirping and the amount of red chirping due to cross phase modulation to occur between light signals of adjacent two wavelengths are set to offset to each other in one repeating section in the transmission path, the compensation of wavelength dispersion may be conducted such that blue chirping and red chirping occur once, respectively, in the one repeating section.

The transmission path in the wavelength dispersion compensating method preferably comprises an optical fiber having a positive value of wavelength dispersion and an optical fiber having a negative value of wavelength dispersion.

According to another aspect of the present invention, a wavelength dispersion compensating method for a transmission path for transmitting wavelength division multiplexed signal light including two or more optical signals of different wavelengths, comprises the steps of dividing the transmission path into a plurality of repeating sections, providing optical amplifiers between the respective repeating sections, for compensating for losses to occur in the transmission path, controlling the time delay amount between signal lights of adjacent two wavelengths to be caused by wavelength dispersion in one repeating section in the transmission path, to be smaller or greater than the bit interval at the transmission rate of the wavelength division multiplexed signal light; and conducting the compensation of wavelength dispersion such that the amount of blue chirping and the amount of red chirping due to cross phase modulation to occur between light signals of adjacent two wavelengths, in one repeating section or multiple repeating sections in the transmission path, offset to each other,.

The optical transmission system of the present invention is constituted by utilizing the aforementioned wavelength dispersion compensating method, and the concrete constitution thereof will be described hereinafter in detail with respect to the preferred embodiments.

Further objects, features and advantages of the present invention will become more apparent from the following description of preferred embodiments when read in conjunction with the accompanying drawings.

BRIEF DESCRIPTION OF THE DRAWINGS

FIG. 4 is a block diagram showing an overall constitution of an optical transmission system according to a first embodiment of the present invention;

FIG. 5 is a view showing an example of a wavelength dispersion map in the first embodiment;

FIG. 6 is a view showing an example of a wavelength dispersion map in a second embodiment of the present invention;

DETAILED DESCRIPTION OF THE PREFERRED EMBODIMENT

There will be firstly described cross phase modulation caused in an optical transmission path in a common optical transmission system, while showing a concrete example thereof.

Figure 1:
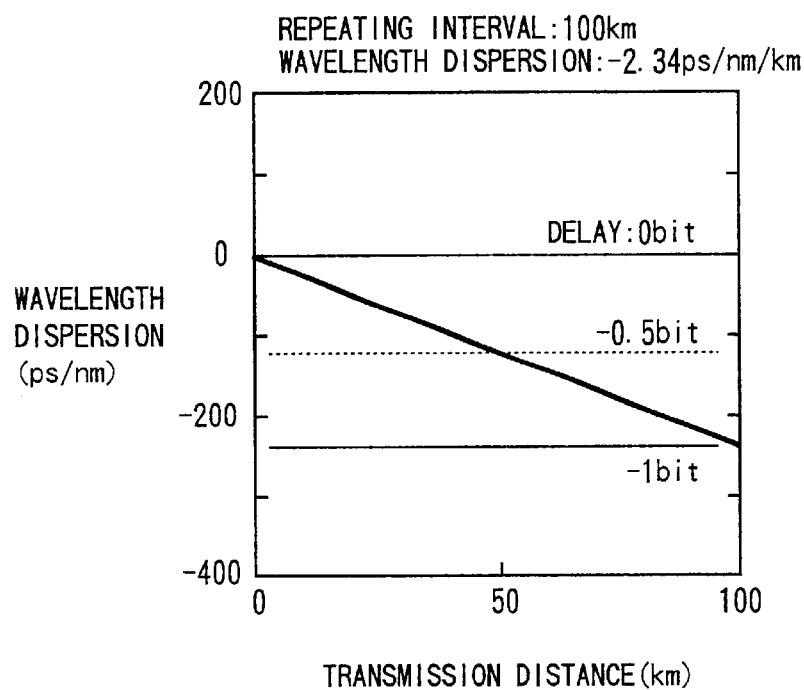
FIG. 1 is a view showing an example of a wavelength dispersion map in one repeating section of a common optical transmission system.

FIG. 1 is a view showing an example of a wavelength dispersion map in one repeating section of a common optical transmission system. Here, there is shown a situation in which a repeating section interval is 100 km, the wavelength dispersion of the optical transmission path is −2.34 ps/nm/km near the signal light wavelength, and the signal light has a wavelength interval of 50 GHz and a transmission rate of 10.664 Gbit/s (bit interval of 93.77 ps).

As shown in FIG. 1, there occurs a wavelength dispersion of −234 ps/nm in the signal lights of a plurality of wavelengths propagated through the optical transmission path over a repeating section of 100 km, resulting in the occurrence of differences in the signal lights in transmission rates. For example, when a signal light wavelength is in a 1550 nm-band or 1580 nm-band, the wavelength interval of 50 GHz corresponds to about 0.4 nm so that the delay amount between signal lights of adjacent (two) wavelengths due to wavelength dispersion becomes −93.6 ps (=−234 ps/nm ×0.4 nm). This leads to a situation where the delay between light pulses of adjacent two wavelengths becomes 1 bit after transmission of 100 km, since the transmission rate is 10.664 Gbit/s (i.e., bit interval of 93.77 ps).

There is now considered an occurring state of red chirping and blue chirping due to cross phase modulation in one repeating section, corresponding to an approaching state of light pulses of adjacent two wavelengths.

For example, when light pulses of adjacent two wavelengths are about to collide with each other at a starting point of 0 km of a repeating section, red chirping due to cross phase modulation occurs if the light pulses of adjacent two wavelengths approach to each other between 0 km and 50 km points of the repeating section, while blue chirping due to cross phase modulation occurs if the light pulses of adjacent two wavelengths separate from each other between 50 km and 100 km points of the repeating section. Further, in a case, for example, light pulses of adjacent two wavelengths are just colliding with each other at the 0 km point, blue chirping due to cross phase modulation occurs if the light pulses of adjacent two wavelengths separate from each other between 0 km and 50 km points of the repeating section, while red chirping due to cross phase modulation occurs if the light pulses of adjacent two wavelengths approach to each other between 50 km and 100 km points. In addition, for example, when light pulses of adjacent two wavelengths are on the way of collision at 0 km point, there occurs an intermediate situation between the aforementioned two types of situations.

Figure 2:
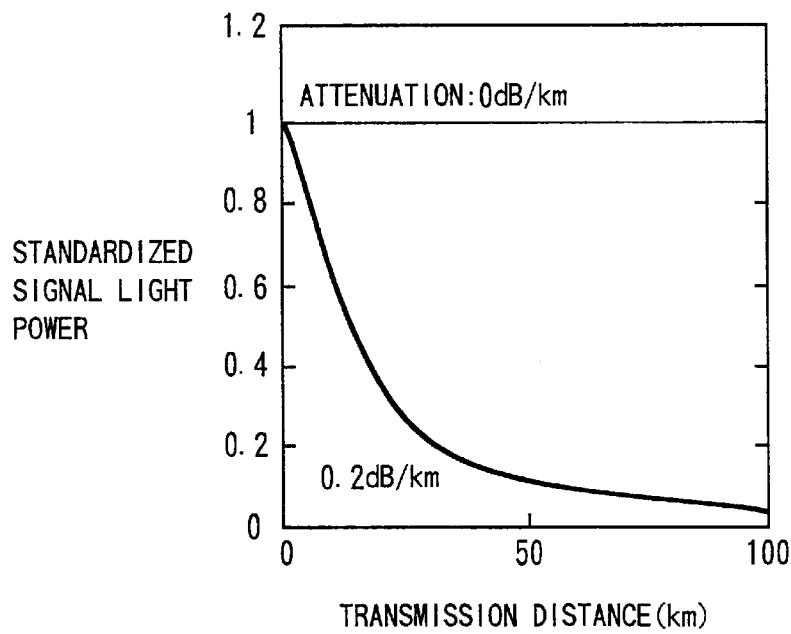
FIG. 2 is a view showing an example of transmission loss in one repeating section of a common optical transmission system.

It is known that the magnitudes of the thus occurred red chirping and blue chirping due to cross phase modulation depend on the power of light pulses of adjacent two wavelengths. Thus, there are now supposed two types of optical transmission paths having transmission losses different from each other as shown in FIG. 2, and there are considered magnitudes of chirpings due to cross phase modulation to occur in the respective optical transmission paths. FIG. 2 shows the changing states of standardized signal light power for the cases of the transmission losses of 0 dB/km and 0.2 dB/km, respectively.

When the transmission loss is 0 dB/km, the power of light pulses of adjacent two wavelengths become constant, respectively, so that the magnitudes of red chirping and blue chirping to occur by the transmission of 100 km become the same irrespectively of the approaching state of the light pulses, resulting in mutual offset.

Contrary, when the transmission loss is 0.2 dB/km, the signal light power after the transmission of 50 km becomes 1/10 of that just after the starting of transmission, and the signal light power after the transmission of 100 km becomes 1/100 of that just after the starting of transmission. Thus, the light power of light pulses of adjacent two wavelengths change on the way of transmission, so that the magnitudes of red chirping and blue chirping to occur become different from each other, resulting in the residue of either one of the chirpings.

Concretely, when, for example, light pulses of adjacent two wavelengths are just colliding with each other at the 0 km point, the magnitude of blue chirping to occur between 0 km and 50 km becomes about 10 times of the magnitude of red chirping to occur between 50 km and 100 km, resulting in the residue of about 90% of the blue chirping.

There will be described an example where a chirping amount due to cross phase modulation is obtained by calculation.

Figure 3A:
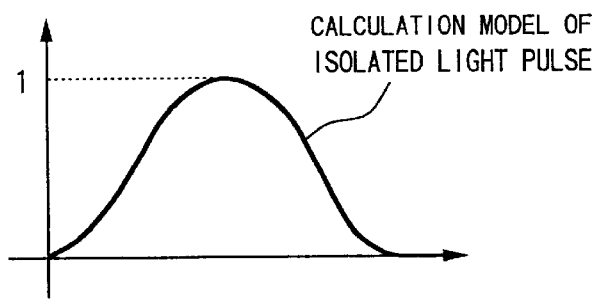
FIG. 3 is a view for explaining a calculation procedure of the amount of chirping due to cross phase modulation.

In calculating the chirping amount due to cross phase modulation, there has been adopted such a model of an isolated light pulse represented by a sine curve such as shown in FIG. 3A. Namely, there is assumed the following equation (1) for isolated light pulses of respective wavelengths:

$$A = \left[\sin\left(2\pi \cdot \frac{dD/dL}{c/\lambda^2 \cdot Br \cdot \Delta f} \cdot L\right) + 1\right] / 2 \quad (1)$$

wherein: D is a wavelength dispersion [ps/nm], dD/dL is a wavelength dispersion per unit length [ps/nm/km], L is an optical fiber length [m], c is a light velocity [m/s], $\lambda$ is a light wavelength [m], Br is a transmission rate [bit/s], and $\Delta f$ is a light frequency interval [Hz].

The chirping amount due to cross phase modulation is proportional to the value of time differential (dA/dt) of the isolated light pulse represented by the equation (1) and the light pulse power, and the total amount of chirping can be obtained by time integration. Note, the time t corresponds to the delay time of the light pulse. Further, it is assumed that the power of the light pulse attenuates in accordance with an exponential function ($e^{31 \; \alpha t}$; $\alpha$ is a constant). The value of the time differential of the equation (1) can be represented by the following equation (2), in which L=v•t (v is a relative velocity between two light pulses) and K is a constant.

$$\frac{dA}{dt} = K \cdot \cos\left(2\pi \cdot \frac{dD/dL}{c/\lambda^2 \cdot Br \cdot \Delta f} \cdot v \cdot t\right) \quad (2)$$

Figure 3B:
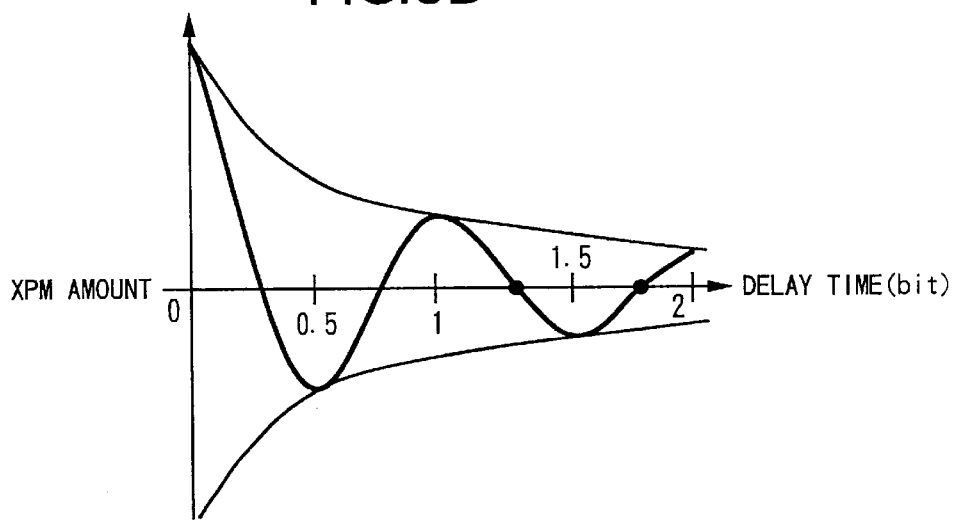
Figure 3C:
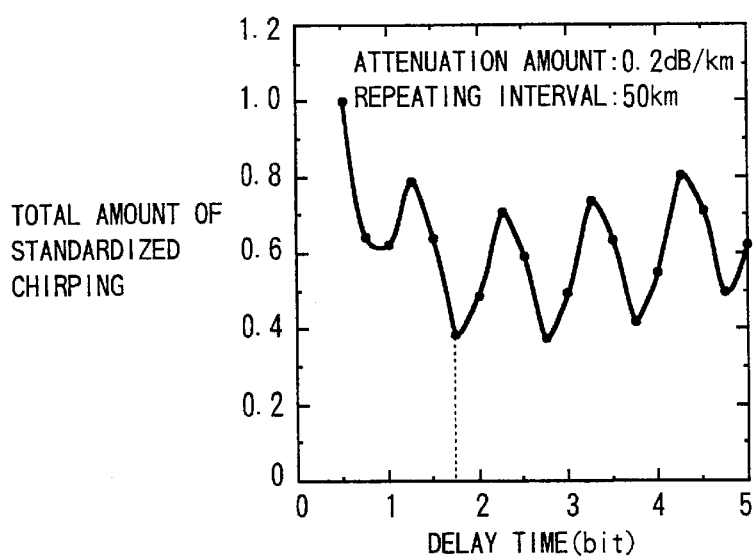

FIG. 3B is a graph showing the chirping amount (XPM amount) to be obtained based on the equation (2) and light power, in accordance with a delay time. Further, FIG. 3C shows a resultant total amount of chirping calculated by integration. In the calculation of FIG. 3C, there are assumed a repeating interval of 50 km, a wavelength interval of 50 GHz and a transmission rate of 10.664 Gbit/s (bit interval is 93.77 ps), and it is supposed that one of the light pulses of adjacent two wavelengths delays relative to the other in a range from 0.5 bit to 5 bits after the transmission of 50 km. Further, the total amount of chirping is standardized, making use of the total amount of chirping where one of the light pulses of adjacent two wavelengths delays by 0. 5 bit relative to the other after the transmission of 50 km. Note, under the aforementioned set conditions, those wavelength dispersions of an optical transmission path which cause the delay of 0.5 to 5 bits, correspond to 2.34 to 23.4 ps/nm/km in absolute value conversion.

The curve shown in FIG. 3B is a primitive function of the integration for obtaining the total amount of chirping, so that the total amount of chirping shown in FIG. 3C is to have a maximum or minimum corresponding to the delay time where the chirping amount becomes zero. Concretely, the total amount obtained by the integration on the range between 0 bit to about 1.75 bits of the delay time becomes the minimum.

In this respect, it can be understood from the calculation result shown in FIG. 3C that the total amount of chirping can be reduced, by increasing the time delay amount between light pulses of adjacent two wavelengths after the transmission of 50 km, to a value larger than 0.5 bit. However, it is extremely difficult to realize such a setting condition that the residue of chirping due to cross phase modulation becomes substantially zero, only in one repeating section where transmission loss occurs.

As such, the present invention provides a technique for rendering red chirping and blue chirping to offset to each other, by appropriately conducting wavelength dispersion management over a plurality of repeating sections, in view of the residue of chirping due to cross phase modulation.

There will be described hereinafter embodiments according the present invention, with reference to the accompanying drawings.

FIG. 4 is a block diagram showing an entire constitution of an optical transmission system according to first and second embodiments of the present invention.

In FIG. 4, the present optical transmission system is constituted such as of an optical transmitting station 1, an optical receiving station 2, a plurality of optical amplifiers (optical repeaters) $3_1$, $3_2$, . . . arranged between the transmitting and receiving stations at predetermined intervals, and an optical transmission path 4 for connecting between the transmitting station 1, respective optical amplifiers $3_1$, $3_2$, and receiving station 2.

The transmitting station 1 includes, for example, a plurality of optical transmitters (E/O) 1A for outputting a plurality of optical signals having wavelengths different from one another, a multiplexer 1B for wavelength multiplexing the plurality of optical signals, and a post-amplifier 1C for amplifying the WDM signal light from the multiplexer 1B to output the amplified light to the optical transmission path 4.

The optical receiving station 2 includes, for example, a pre-amplifier 2A for amplifying the signal light transmitted via the optical transmission path 4 to a required level, a demultiplexer 2B for demultiplexing the output light from the pre-amplifier 2A into a plurality of optical signals corresponding to wavelengths, respectively, and a plurality of optical receivers (O/E) 2C for receiving and processing the plurality of optical signals, respectively.

Each of the optical amplifiers $3_1$, $3_2$, is a known type of optical amplifier capable of collectively amplifying the WDM signal light arriving at each portion of the optical transmission path 4. Concretely, it is possible to adopt an optical fiber amplifier utilizing an optical fiber doped with ions of a rare earth element such as erbium.

The optical transmission path 4 includes a first repeating section $4_1$, for connecting between the transmitting station 1 and the optical amplifier $3_1$, second through (n-1)-th repeating sections $4_2$ to $4_{n-1}$ for connecting the optical amplifiers $3_1$ through $3_{n-1}$, respectively, and an n-th repeating section $4_n$ for connecting between the optical amplifier $3_{n-1}$ and the optical receiving station 2. Those optical fibers to be used for the respective repeating sections possess predetermined wavelength dispersion characteristics set in accordance with the dispersion compensating method of the present invention, and there is considered here a situation adopting a single sort of optical fiber having uniform wavelength dispersion characteristic.

In the optical transmission system having the aforementioned constitution, those transmission losses caused in the respective repeating sections are concentratedly compensated at the associated optical amplifiers, respectively. In a system where the gain is concentratedly possessed in the manner noted above, it is important to conduct a wavelength dispersion management over a plurality of repeating sections in view of the attenuation of signal light power due to the aforementioned transmission losses.

FIG. 5 is a view showing an example of a wavelength dispersion map in the first embodiment. For example, it is supposed here that the repeating interval is 50 km, the wavelength dispersion of the optical transmission path near the signal light wavelength is −2.34 ps/nm/km, the wavelength interval of signal light is 50 GHz, and the transmission rate is 10.664 Gbit/s (bit interval of 93.77 ps). Under such a setting condition, the time delay amount to be caused between light signals of adjacent two wavelengths in one repeating section due to wavelength dispersion becomes ½ times the bit interval. Namely, one of the light pulses of adjacent two wavelengths is delayed from the other by 1 bit after the transmission of 100 km (i.e., after the transmission of two transmission sections). FIG. 5 shows, in a solid line, a change of wavelength dispersion to occur in such a case. Note, the present invention is not limited to the aforementioned setting condition, and the same can be said for other embodiments to be described later.

In FIG. 5, the solid line represents a situation where light pulses of adjacent two wavelengths are about to collide with each other to the 0 km point of the transmission distance. Red chirping occurs due to cross phase modulation when the light pulses of adjacent two wavelengths approach to each other within the first repeating section (from 0 km to 50 km), while blue chirping occurs due to cross phase modulation when the light pulses of adjacent two wavelengths separate from each other within the second repeating section (from 50 km to 100 km). In this case, the loss in the transmission path to be caused in each repeating section is compensated for by each optical repeater and the light power is restored to its original state, so that the power change of light pulses is the same in each repeating section. Thus, the total amount of red chirping to occur in the first repeating section becomes substantially the same as that of blue chirping to occur in the second repeating section. In this way, both kinds of chirpings due to cross phase modulation to occur between adjacent two wavelengths offset to each other at every two repeating sections, resulting in drastic reduction of such chirpings.

Similarly to the above, there is further considered such a situation where light pulses of adjacent two wavelengths are just colliding with each other at 0 km. Also in this case, the total amount of blue chirping to occur in the first repeating section becomes substantially the same as that of red chirping to occur in the second repeating section. In this way, both kinds of chirpings due to cross phase modulation offset to each other, resulting in drastic reduction of such chirpings after the transmission of 100 km. Moreover, when light pulses of adjacent two wavelengths are on the way of collision at 0 km, there occurs an intermediate situation between the aforementioned two types of situations, resulting in the same effect with the above situations.

In FIG. 5, the change depicted by a chain line represents a situation where a light pulse is delayed by 1 bit after the transmission over one repeating section. Namely, according to the aforementioned setting condition, this represents a situation of two light pulses separated by another wavelength interval therebetween, rather than light pulses of adjacent two wavelengths. In this case, both red chirping and blue chirping occur in one repeating section, such that, due to the affection of the loss in the transmission path, one type (red chirping in FIG. 5) of chirpings occurs at the time when the light level has not been attenuated while the other type of chirpings occurs at the time when the light level has been largely attenuated, resulting in the residue of that chirping which occurred at the time the attenuation was less. Thus, in a system where a loss in a transmission path exists and this loss is to be compensated for by an optical amplifier, upon reducing those chirpings due to cross phase modulation to occur between signal lights of adjacent two wavelengths, it is required that the delay amount of light pulse within one repeating section should not become 1 bit of the light pulse.

In the above description, the waveform of signal light has been supposed to be an isolated light pulse. Actually, the present invention is also effective for signal light having an encoding format typically and widely used in optical communications, such as an NRZ (Non-Return-to-Zero) code or RZ (Return-to-Zero) code.

For example, in case of adopting the NRZ code, when code "1" meaning "ON" of light pulse continues, this situation differs from the aforementioned situation where the isolated light pulse was supposed. Nonetheless, even in such case, the red chirping to occur corresponding to the leading edge of the portion constituted of the continuing "1" and the blue chirping to occur corresponding to the falling edge of the continuing "1" will offset to each other, resulting in the same effect as in the case of the isolated light pulses. However, in such a case that there is generated an extremely long series of "1" in which one light pulse noway gets ahead of the other light pulse over all the transmission distance between the optical transmitting station and the optical receiving station, no occasions are given for the occurrence of blue chirping, resulting in the residue of red chirping. Considering this standpoint, it is preferable to adopt the RZ code as the encoding format of signal light. The same can be said for other embodiments to be described hereinafter, concerning the encoding format of signal light.

According to the first embodiment as described above, it becomes possible to reduce the waveform distortion caused by cross phase modulation between signal lights of adjacent two wavelengths, by conducting the dispersion management for setting such as wavelength dispersion characteristics of the optical transmission path such that one of light pulses of adjacent two wavelengths is delayed from the other by 1 bit in two repeating sections. The wavelength dispersion management can be more assuredly conducted, by equalizing the intervals between wavelengths of signal lights, and the intervals between repeating sections, and by substantially equalizing the changes of light power in the respective repeating sections.

There will be described hereinafter a second embodiment of the present invention.

In the second embodiment, there will be described a situation where three repeating sections are set as a unit, whereas two repeating sections have been set as a unit for conducting the wavelength dispersion management in the aforementioned first embodiment.

FIG. 6 is a view showing an example of a wavelength dispersion map in the second embodiment. However, the wavelength dispersion of the optical transmission path near the signal light wavelength is set to be −1.56 ps/nm/km here. Other setting items are identical with the situation shown in FIG. 5, i.e., the repeating interval is 50 km, the wavelength interval of signal lights is 50 GHz, and the transmission rate is 10.664 Gbit/s (bit interval of 93.77 ps). Under such a setting condition, the time delay amount to be caused between light signals of adjacent two wavelengths in one repeating section due to wavelength dispersion becomes 1/3 times of the bit interval. Namely, one of the light pulses of adjacent two wavelengths is delayed from the other by 1 bit after the transmission of 150 km (i.e., after the transmission of three transmission sections). FIG. 6 shows, in a solid line, the change of wavelength dispersion to occur in such a case. Further, for two light pulses separated by another wavelength interval therebetween, a delay of 2 bits is caused under the same condition, and the change of wavelength dispersion to occur in such a case is represented by a dashed line. Moreover, for a light pulse separated from the wavelength represented by the dashed line by a further wavelength interval, the change of wavelength dispersion is represented by a chain line.

In FIG. 6, there is considered, for example, such a situation where light pulses of adjacent two wavelengths are about to collide with each other at the 0 km point of the transmission distance. Red chirping occurs due to cross phase modulation when the light pulses of adjacent two wavelengths (corresponding to the solid line in FIG. 6) approach to each other within the first repeating section and the former half of the second repeating section (collectively, from 0 km to 75 km), while blue chirping occurs due to cross a phase modulation when the light pulses of adjacent two wavelengths separate from each other within the latter half of the second repeating section and the third repeating section (collectively, from 75 km to 150 km).

Paying attention to the amount of actually occurred chirping, this amount takes a minimum value of chirping at the position where the type of chirping is changed, and takes a maximum value at the center position of one type of chirping. Considering the characteristics of the solid line in FIG. 6 with respect to the transmission distance and the amount of chirping, the chirping becomes minimum at the respective points of 0 km, 75 km and 150 km, and exhibits maximum values at the respective points of 37.5 km and 112.5 km.

At the position of an optical amplifier at the 50 km point, light amplification is conducted at the time when the chirping amount has attenuated to a certain degree. At the position of an optical amplifier at the 100 km point, light amplification is conducted at the time when the chirping is on the way to be increased from 0 (zero) toward the maximum value. Namely, the chirping upon entering the optical amplifier is in a relatively non-large state, so that the chirping can be considered while neglecting a level difference to occur in the transmission path.

Thus, the total amount of red chirping to occur in the first repeating section and the former half of the second repeating section becomes substantially the same as that of blue chirping to occur in the latter half of the second repeating section and the third repeating section. In this way, both kinds of chirpings due to cross phase modulation to occur between adjacent two wavelengths offset to each other at every three repeating sections, resulting in drastic reduction of such chirpings.

For two light pulses (corresponding to the dashed line in FIG. 6) separated by another wavelength interval therebetween, red chirping occurs when the light pulses approach to each other within the former 3/4 portion (from 0 km to 37.5 km) of the first repeating section, while blue chirping occurs when the light pulses separate from each other within the latter 1/4 portion of the first repeating section and the former half of the second repeating section (from 37.5 km to 75 km). Further, red chirping occurs when the light pulses approach to each other within the latter half of the second repeating section and the former 1/4 portion of the third repeating section (from 75 km to 112.5 km), while blue chirping occurs when the light pulses separate from each other within the latter 3/4 portion of the third repeating section (from 112.5 km to 150 km). In this way, the total amount of red chirping and that of blue chirping to occur over the three repeating sections become substantially the same, so that both kinds of chirpings due to cross phase modulation to occur between two light pulses separated by another wavelength interval therebetween offset to each other at every three repeating sections.

Similarly to the above, there is further considered such a situation where light pulses of adjacent two wavelengths are just colliding with each other at 0 km. In this case, the total amount of blue chirping to occur in the first repeating section and the former half of the second repeating section becomes substantially the same as that of red chirping to occur in the latter half of the second repeating section and the third repeating section. Thus, both kinds of chirpings due to cross phase modulation offset to each other after the transmission of 150 km, resulting in drastic reduction of such chirpings.

Further, for two light pulses separated by another wavelength interval therebetween, the total amount of blue chirpings to occur in the former 3/4 portion of the first repeating section and in the latter half of the second repeating section and the former 1/4 portion of the third repeating section, respectively, becomes substantially the same as that of red chirpings to occur in the latter 1/4 portion of the first repeating section and the former half of the second repeating section and in the latter 3/4 portion of the third repeating section, respectively. Thus, both kinds of chirpings due to cross phase modulation to occur between two light pulses separated by another wavelength interval therebetween also offset to each other at every three repeating sections.

Moreover, when light pulses of adjacent two wavelengths are on the way of collision at 0 km, there occurs an intermediate situation between the aforementioned two types of situations, resulting in the same effect with the above situations.

In FIG. 6, the change depicted by a chain line represents a situation where a light pulse is delayed by 1 bit after the transmission over one repeating section. Namely, according to the aforementioned setting condition, this represents a situation of two light pulses separated by two wavelength intervals therebetween. In this case, both red chirping and blue chirping occur in one repeating section, resulting in the residue of one type of chirping (red chirping in FIG. 6)

similarly to the conventional. Thus, the aforementioned setting condition is effective for those signal lights of adjacent two wavelengths and for two signal lights separated by another wavelength interval therebetween, so as to reduce chirpings due to cross phase modulation.

According to the second embodiment as described above, it becomes possible to reduce the waveform distortion caused by cross phase modulation between signal lights of adjacent two wavelengths and between two signal lights separated by another wavelength interval therebetween, by conducting the dispersion management for setting such as wavelength dispersion characteristics of the optical transmission path such that one of light pulses of adjacent two wavelengths is delayed from the other by 1 bit in three repeating sections.

In the second embodiment as described above, the wavelength dispersion characteristic of the optical transmission path is set such that one of light pulses of adjacent two wavelengths is delayed from the other by 1 bit in three repeating sections. However, as another setting example for conducting the wavelength dispersion management which sets three repeating sections as a unit, it is possible to set the wavelength dispersion characteristic of the optical transmission path such that one of light pulses of adjacent two wavelengths is delayed from the other by 2 bits after the transmission of three repeating sections. In this case, if other setting conditions are identical with the above, the wavelength dispersion of the optical transmission path may be $-3.12$ ps/nm/km.

Further, in the first and second embodiments, there have been described situations where the wavelength dispersion management is conducted by setting two or three repeating sections as a unit. However, the present invention is not limited thereto, and it is possible to conduct the wavelength dispersion management by setting four or more repeating sections as a unit. For example, in case of conducting the wavelength dispersion management by setting four repeating sections as a unit, the wavelength dispersion characteristic of the optical transmission path may be set such that one of light pulses of adjacent two wavelengths is delayed from the other by 1 bit or by 3 bits after the transmission of four repeating sections.

There will be described hereinafter a third embodiment of the present invention.

In the aforementioned first and second embodiments, there have been described such situations that the transmission losses of the respective repeating sections in optical transmission path are concentratedly compensated for by using the respective optical amplifiers. In this third embodiment, there will be considered such a situation where the loss of optical transmission path is distributively compensated.

Figure 7:
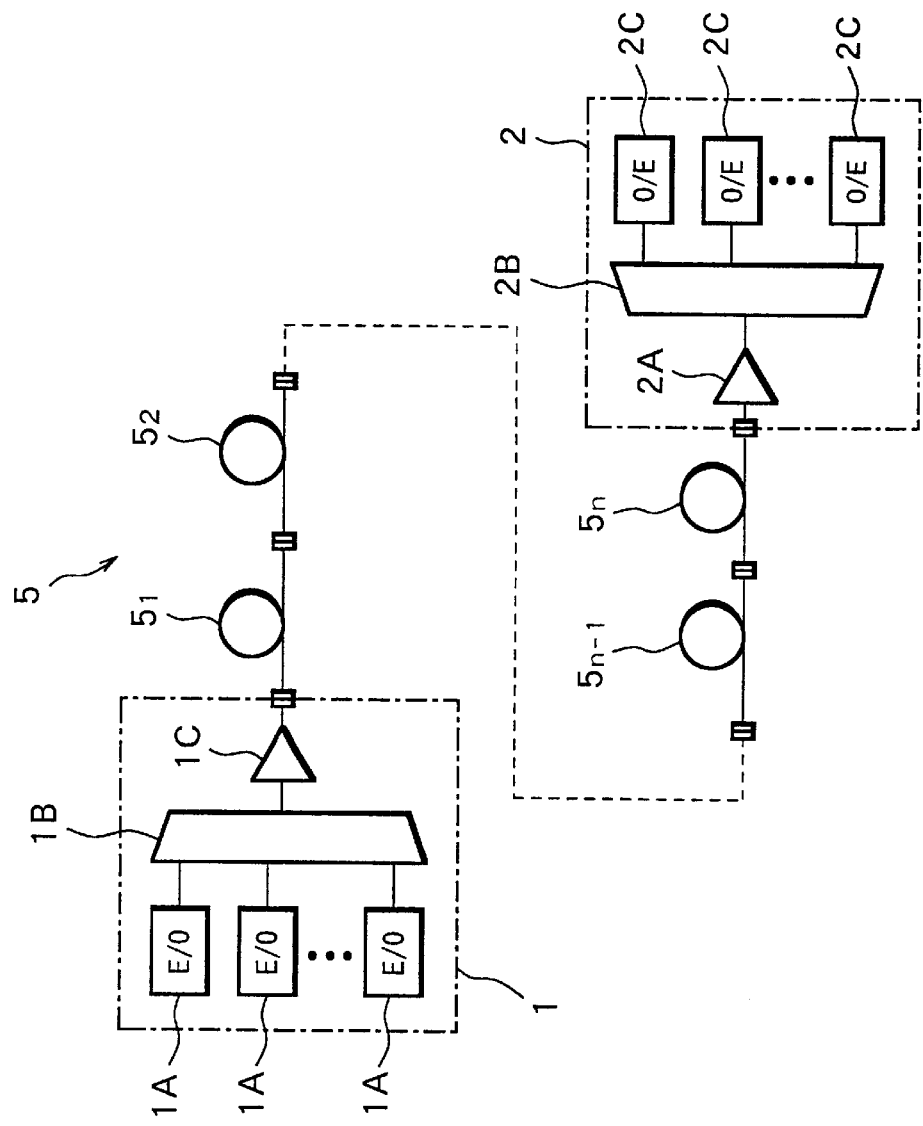
FIG. 7 is a block diagram showing an overall constitution of an optical transmission system according to a third embodiment of the present invention.

FIG. 7 is a block diagram showing an overall constitution of an optical transmission system according to the third embodiment of the present invention. Those parts identical with the system constitution shown in FIG. 4 are denoted by the same reference numerals.

In FIG. 7, the present optical transmission system is constituted such that the optical transmission between the optical transmitting station 1 and optical receiving station 2 is conducted by using an optical transmission path 5 the transmission loss of which is controlled to be about 0 dB/km. As the optical transmission path 5, it is possible to apply one having a function for distributively compensating for loss thereof, such as by an optical amplification technique adopting stimulated Raman scattering, or by another optical amplification technique utilizing an optical fiber doped with ions of a rare earth element such as erbium as an optical transmission path. Further, for the optical transmission path 5, it is supposed here that repeating sections $5_1$ through 5 are set corresponding to the repeating sections $4_1$ through $4_n$ in the aforementioned first and second embodiments.

In the optical transmission system having the aforementioned distributive amplification gain, the wavelength dispersion characteristics of the optical transmission path 5 are set such that the number of collisions between light pulses of adjacent two wavelengths becomes integer times, in each of the repeating sections $5_1$ through $5_n$. Concretely, the wavelength dispersion D of the optical transmission path 5 per one repeating section is set to satisfy the relationship represented by the following equation (3).

$$D = N \times [c/(\lambda^2 \times Br \times \Delta f)] \cdots (3).$$

wherein Br is a transmission rate of signal light, and the inverse number thereof is equal to a light pulse interval (bit interval). Further, c is a light velocity, $\lambda$ is a signal light wavelength, $\Delta f$ is a light frequency interval, and N is an arbitrary integer. For example, when the transmission rate Br is 10 Gbit/s, the light velocity c is $3 \times 10^8$ m/s, the signal light wavelength $\lambda$ is 1.55 $\mu$m, and the light frequency interval $\Delta f$ is 100 GHz, the wavelength dispersion D of the optical transmission path per one repeating section becomes N times of 125 ps/nm. The following Table 1 shows examples of calculations conducted for several conditions conforming to the ITU Standard.

| ITU-grid # | Wavelength (nm) | Transmission Rate (Gbit/s) | Light Frequency Interval (GHz) | Basic Amount of Wavelength Dispersion (ps/nm) |
|---|---|---|---|---|
| 0 | 1552.52 | 9.95 | 50 | 250 |
| 0 | 1552.52 | 9.95 | 100 | 125 |
| 0 | 1552.52 | 10.66 | 50 | 234 |
| 0 | 1552.52 | 10.66 | 100 | 117 |
| −160 | 1585.37 | 9.95 | 50 | 240 |
| −160 | 1585.37 | 9.95 | 100 | 120 |
| −160 | 1585.37 | 10.66 | 50 | 224 |
| −160 | 1585.37 | 10.66 | 100 | 112 |

As seen, Table 1 shows the calculation results of basic amounts (D/N) of wavelength dispersion in those cases supposing that, for example, the signal light wavelength $\lambda$ is 1552.52 nm and 1585.37 nm, and and setting that the transmission rate is 9.95 Gbit/s and 10.66 Gbit/s and the light frequency interval is 50 GHz and 100 GHz, for the thus supposed wavelengths, respectively. The reason why two types of transmission rates are set around 10 Gbit/s is to correspond to whether an error-correcting code is to be applied or not. The transmission rate of 9.95 Gbit/s corresponds to a situation where the error-correcting code is not applied, and the transmission rate of 10.66 Gbit/s corresponds to a situation where such as a Reed-Solomon code (RS code) is applied as the error-correcting code.

In the optical transmission system having the aforementioned constitution, the wavelength dispersion characteristics of the optical transmission path 5 are set such that the number of collisions between light pulses of adjacent two wavelengths becomes integer times in one repeating section, i.e., such that one of light pulses of adjacent two wavelengths is delayed from the other by N bits in one repeating section. Thus, the total amount of red chirping and that of blue chirping, to occur when one light pulse gets ahead of the other, become substantially the same, so that both kinds of chirpings due to cross phase modulation offset to each other. By conducting such a dispersion management, it becomes possible to reduce the waveform distortion caused by cross phase modulation between signal lights of respective wavelengths.

There will be described hereinafter a fourth embodiment of the present invention.

Figure 8:
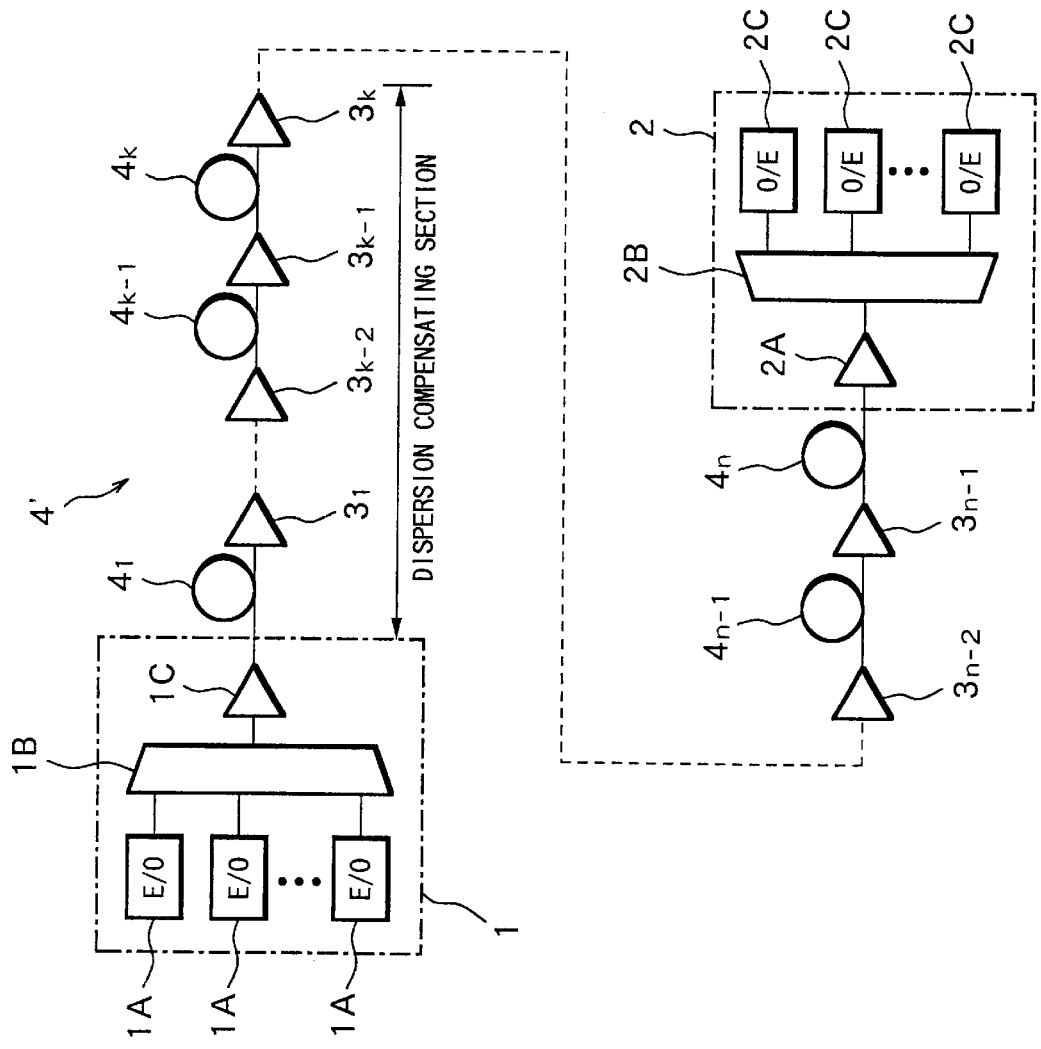
FIG. 8 is a block diagram showing an overall constitution of an optical transmission system according to a fourth embodiment of the present invention.

FIG. 8 is a block diagram showing an overall constitution of an optical transmission system according to a fourth embodiment of the present invention. Those parts identical with the system constitution shown in FIG. 4 are denoted by the same reference numerals.

The present optical transmission system in FIG. 8 is provided by substituting an optical transmission path 4' for collectively conducting the compensation of accumulated wavelength dispersion at every predetermined dispersion compensating sections, for the optical transmission path 4 in the system constitution shown in FIG. 4. This optical transmission path 4' collectively compensates for the wavelength dispersions accumulated over the first repeating section $4_1$ through (k-1)th repeating section $4_{k-1}$, at a k-th repeating section $4_k$. It is considered here that, when the repeating interval is 50 km, the wavelength dispersion is to be compensated for at every 9 repeating sections, i.e., that there is assumed a dispersion compensating section of 450 km by setting k=9. Concretely in this case, it is possible to set such that the wavelength dispersion of the optical transmission path to be used in each of the 1st through 8th repeating sections is −2.34 ps/nm/km, and that of the 9th repeating section is +18.7 ps/nm/km. Of course, the above values of wavelength dispersion are to be given near the signal light wavelength. The setting of dispersion compensating sections and the setting of wavelength dispersion characteristics of optical transmission path in the present invention are not limited to the above situations.

Figure 9:
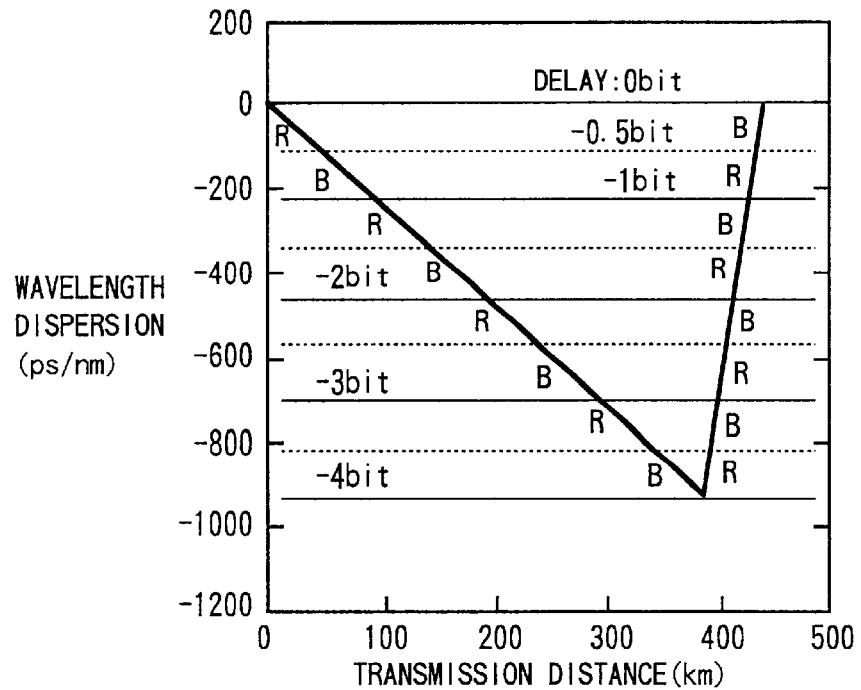
FIG. 9 is a view showing a wavelength dispersion map concerning one dispersion compensating section in the fourth embodiment.

FIG. 9 is a view showing a wavelength dispersion map concerning one piece of dispersion compensating section in the fourth embodiment. Similarly to the above first embodiment, it is supposed here that the repeating interval is 50 km, the wavelength interval of signal lights is 50 GHz, and the transmission rate is 10.664 Gbit/s (bit interval of 93.77 ps).

As shown in FIG. 9, in the 1st through 8th repeating sections $4_1$ to $4_8$ in one dispersion compensating section, one of light pulses of adjacent two wavelengths is delayed from the other by 1 bit after the transmission of two repeating sections, and the two types of chirpings are compensated for each other in the adjacent odd-numbered sections and even-numbered sections, respectively. This situation is the same as the first embodiment. On the other hand, in the 9th repeating section $4_9$ for compensating for the wavelength dispersion accumulated over the 1st through 8th repeating sections $4_1$ to $4_8$, one of light pulses of adjacent two wavelengths is delayed from the other by 4 bits (i.e., is advanced from the other by 4 bits, expressing in a relative relationship with other repeating sections). In the optical transmission path of this 9th repeating section $4_9$, the power of light pulses changes due to the transmission loss, so that those chirpings to occur in the former half of this repeating section become larger than those chirpings to occur in the latter half of this repeating section, resulting in the residue of either red chirping or blue chirping. In case of FIG. 9, this results in a slight amount of residue of red chirping in the 9th repeating section $4_9$.

Nonetheless, since the combination of red chirping and blue chirping is generated multiple times within the 9th repeating section $4_9$, both chirpings alters with each other successively while the changed amount of loss due to the transmission path is small, thereby enabling only a smaller amount of chirping residue. Namely, when the transmission path exhibits attenuation and the attenuation is to be compensated for by the optical amplifier, it is possible to reduce the compensation error of the chirping amount by generating the combination of red chirping and blue chirping many times within one piece of repeating section.

According to the fourth embodiment as described above, the accumulated wavelength dispersion is collectively compensated for at every predetermined dispersion compensating sections, so that the degradation of a signal light waveform due to the accumulated wavelength dispersion can be reduced in addition to the effect in the first embodiment, thereby enabling realization of an optical transmission system having superior transmission characteristics.

There will be described hereinafter a fifth embodiment of the present invention.

In the fifth embodiment, there will be described an improved example for reducing the chirping left in the 9th repeating section in the fourth embodiment.

The constitution of the optical transmission system according to the fifth embodiment is provided by modifying the dispersion compensating section from 9 repeating sections to 10 repeating sections, for the fourth embodiment shown in FIG. 8. Namely, there is set a dispersion compensating section of 500 km, by setting k=10 in FIG. 8. As a concrete constitution of the optical transmission path 4', it is set, for example, that the wavelength dispersion of the optical transmission path to be used in each of the 1st through 9th repeating sections is −2.34 ps/nm/km, and that of the 10th repeating section is +21.1 ps/nm/km. Of course, the above values of wavelength dispersion are to be given near the signal light wavelength.

Figure 10:
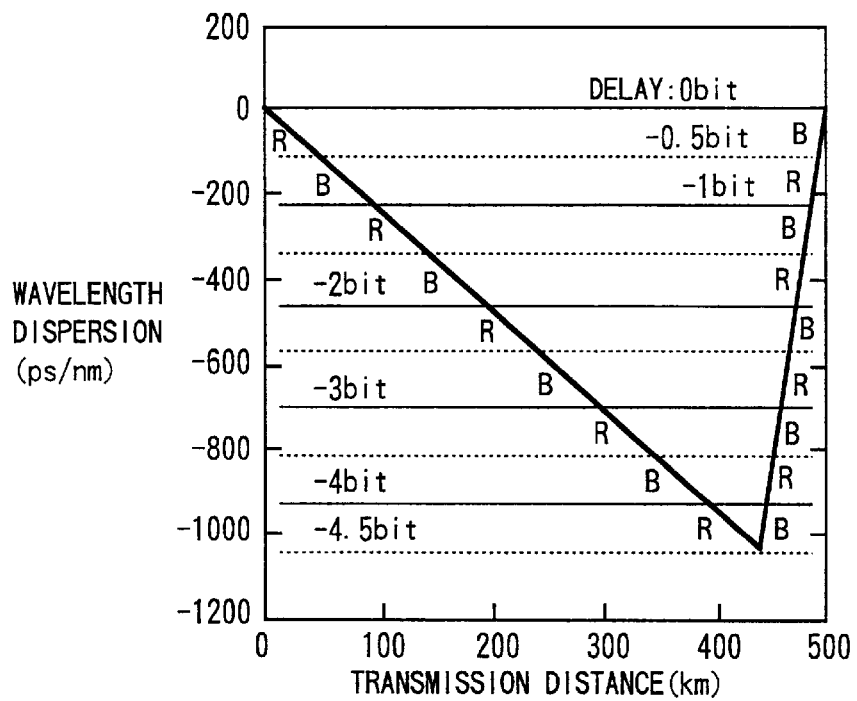
FIG. 10 is a view showing a wavelength dispersion map concerning one dispersion compensating section in a fifth embodiment of the present invention.

FIG. 10 is a view showing a wavelength dispersion map concerning one dispersion compensating section in the fifth embodiment. It is supposed here that the repeating interval is 50 km, the wavelength interval of signal lights is 50 GHz, and the transmission rate is 10.664 Gbit/s (bit interval of 93.77 ps).

As shown in FIG. 10, in the 1st through 9th repeating sections $4_1$ to $4_9$ in one dispersion compensating section, one of light pulses of adjacent two wavelengths is delayed from the other by 1 bit after the transmission of two repeating sections. The two types of chirpings offset to each other in the adjacent odd-numbered sections and even-numbered sections, respectively, through the 1st through 8th repeating sections $4_1$ to $4_8$, while one type of chirping (red chirping in the shown example) is left in the 9th repeating section $4_9$. On the other hand, in the 10th repeating section $4_{10}$ for compensating for the wavelength dispersion accumulated over the 1st through 9th repeating sections $4_1$ to $4_9$, one of light pulses of adjacent two wavelengths is delayed from the other by 4.5 bits (i.e., is advanced from the other by 4.5 bits, expressing in a relative relationship with other repeating sections). In the optical transmission path of this 10th repeating section $4_{10}$, the power of light pulses changes due to the transmission loss, so that those chirpings to occur in the former half of this repeating section become larger than those chirpings to occur in the latter half of this repeating section, resulting in the residue of either red chirping or blue chirping (the residue of blue chirping in the shown example). Thus, the chirping amount to occur in the 9th repeating section $4_9$ and that to be left in the 10th repeating section $4_{10}$ are offset with each other. However, since the chirping amount in the 9th repeating section $4_9$ and that in the 10th repeating section $4_{10}$ are typically different from each other, a slight amount of chirping will be left.

Nonetheless, this residual amount is extremely small, as compared to the fourth embodiment.

According to the fifth embodiment as described above, there are set dispersion compensating sections for every 10 repeating sections, and the chirping to be left in the 10th repeating section $4_{10}$ for compensating for the accumulated wavelength dispersion is reduced by the chirping occurred in the 9th repeating section $4_9$, thereby enabling further reduction in the affection of the chirping due to cross phase modulation.

In the aforementioned fourth and fifth embodiments, there is conducted the basic wavelength dispersion management by setting two repeating sections as a unit similarly to the first embodiment. However, the present invention is not limited thereto, and such an application is possible to conduct the wavelength dispersion management by setting three or more repeating sections as a unit similarly to the second embodiment.

There will be described hereinafter a sixth embodiment of the present invention.

Figure 11:
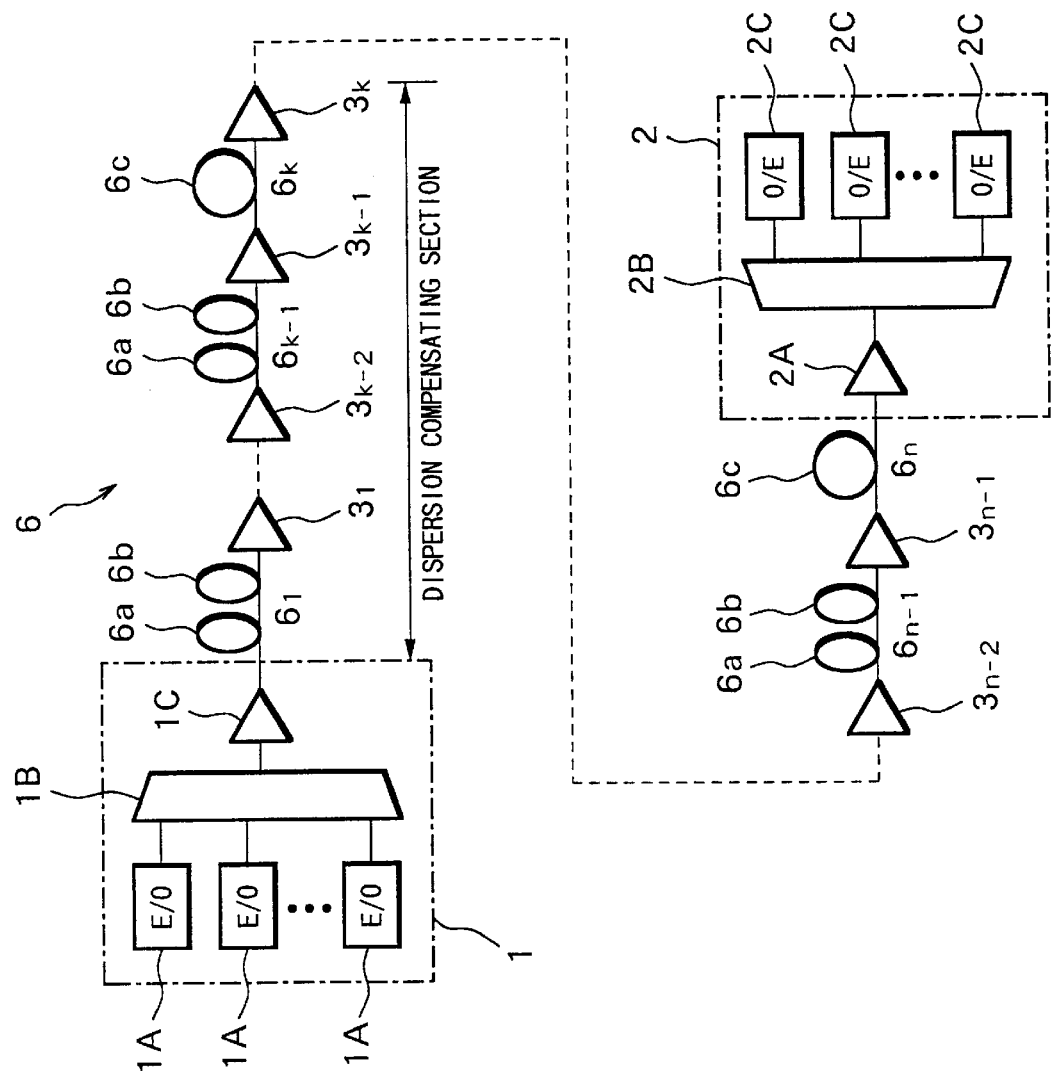
FIG. 11 is a block diagram showing an overall constitution of an optical transmission system according to a sixth embodiment of the present invention.

FIG. 11 is a block diagram showing an overall constitution of an optical transmission system according to a sixth embodiment of the present invention.

The constitution of this optical transmission system in FIG. 11 is provided by substituting an optical transmission path 6 including a hybrid transmission path comprising two types of optical fibers having wavelength dispersion characteristics opposite to each other, for the optical transmission path 4' such as in the system constitution shown in FIG. 8. This optical transmission path 6 collectively compensates for the wavelength dispersions accumulated over the first repeating section $6_1$ through (k−1)th repeating section $6_{k-1}$, at a k-th repeating section $6_k$, and thereafter the accumulated wavelength dispersion is similarly compensated for every k repeating sections. This is the same as the fourth and fifth embodiments. The feature of this embodiment resides in that, for each of repeating sections $6_1$ to $6_{k-1}$ where no compensations are conducted for the accumulated wavelength dispersion, there is adopted a hybrid transmission path using a first optical fiber $6_a$ having a positive value of wavelength dispersion and a positive dispersion slope for a signal light wavelength at the former half (transmitting side) thereof, and a second optical fiber $6_b$ having a negative value of wavelength dispersion and a negative dispersion slope for the signal light wavelength, at the latter half (receiving side) thereof. Contrary, for the k-th repeating section $6_k$ for conducting the compensation of accumulated wavelength dispersion, there is applied an optical transmission path adopting a third optical fiber $6_c$ having a wavelength dispersion opposite to the accumulated wavelength dispersion to occur in the preceding repeating sections. The constitution of this optical transmission path 6 has been previously proposed by the present inventors (see Japanese Patent Application Nos. 11-58499 and 11-104158). The outline thereof will be briefly described hereinafter.

As the first optical fiber, such as a 1.3 µm zero dispersion single-mode fiber (SMF) can be used. Such a 1.3 µm zero dispersion SMF is a common optical fiber having a wavelength dispersion of zero near 1.3 µm and having a required wavelength dispersion slope such that the wavelength dispersion increases as the wavelength increases, so that the optical fiber has a positive wavelength dispersion in the signal light band of 1.5 µm. This 1.3 µm zero dispersion SMF is characterized in that the nonlinear effective cross section is large and the transmission loss is small. As the second optical fiber $6_b$, it is possible to adopt such as a reversed dispersion fiber (RDF) which is designed to have a wavelength dispersion and wavelength dispersion slope opposite to those of the first optical fiber $6_a$, respectively, by adjusting such as the material and structure of the optical fiber. This RDF is characterized in that its nonlinear effective cross section is smaller and the transmission loss of RDF is relatively large, compared to a 1.3 µm zero dispersion SMF. Further, as the third optical fiber $6_c$, it is possible to adopt such as a 1.3 µm zero dispersion SMF similarly to the first optical fiber $6_a$.

It is preferable that the accumulated wavelength dispersion to occur over the overall hybrid transmission path has a negative value, by setting such that the sum of the amount of accumulated wavelength dispersion in the first optical fiber $6_a$ and that in the second optical fiber $6_b$ becomes negative, i.e., such that the compensation of wavelength dispersion by the second optical fiber $6_b$ to the first optical fiber $6_a$ becomes slightly excessive. This is to avoid such a situation where the totally positive value of accumulated wavelength dispersion leads to a larger light peak power due to a compression effect of a light pulse, resulting in a susceptibility to a nonlinear effect. Further, for the lengths of the first optical fiber $6_a$ and second optical fiber $6_b$, it is preferable that the ratio of the length of the second optical fiber $6_b$ to that of the first optical fiber $6_a$ in one repeating section is set to be 20% and 40% (concerning details, see the aforementioned Japanese Patent Application No. 11-58499). The present invention is never limited to such setting.

Figure 12:
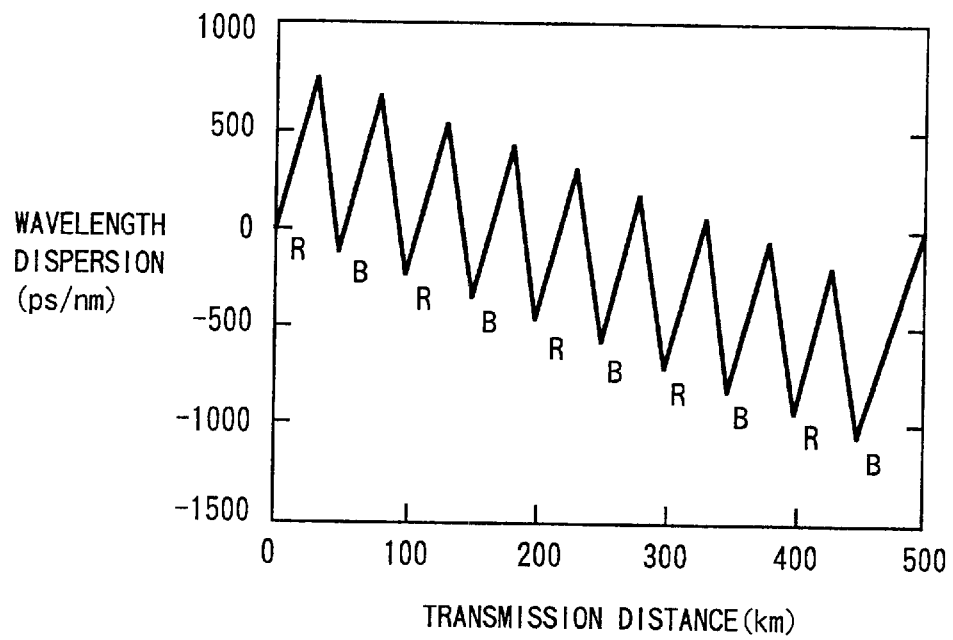
FIG. 12 is a view showing a wavelength dispersion map concerning one dispersion compensating section in the sixth embodiment.
Figure 13:
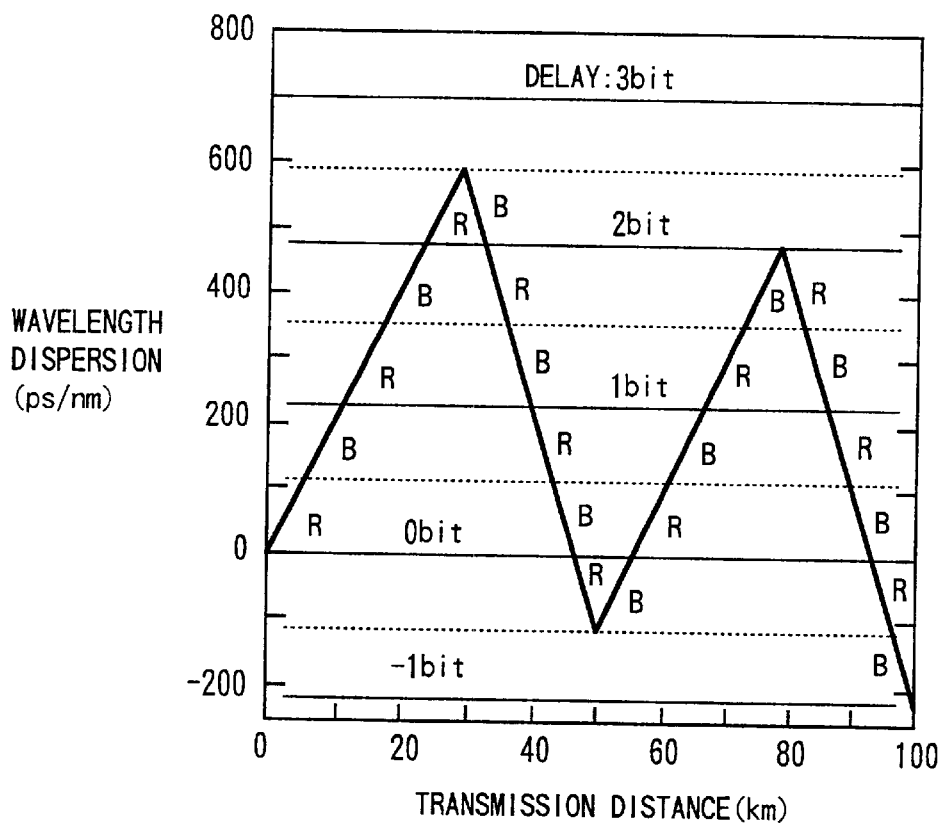
FIG. 13 is a view showing a wavelength dispersion map of first and second repeating sections in the sixth embodiment.

FIG. 12 is a view showing a wavelength dispersion map concerning one dispersion compensating section in the sixth embodiment. Further, FIG. 13 is an enlarged view of the first and second repeating sections in FIG. 12, and shows such a situation setting a repeating interval of 50 km, a wavelength interval of 50 GHz for signal lights, a transmission rate of 10.664 Gbit/s (bit interval of 93.77 ps), and one dispersion compensating section comprising 10 repeating sections, i.e., such a situation where a dispersion compensating section of 500 km is set by setting k=10 in FIG. 11. As the concrete setting of the first and second fibers $6_a$, $6_b$ under such a setting condition, it is possible that the first optical fiber $6_a$ has a wavelength dispersion of +1 7.6 ps/nm/km and a length of 33.3 km, and the second optical fiber $6_b$ has a wavelength dispersion of −42.0 ps/nm/km and a length of 16.7 km. In this case, after the transmission of one repeating section adopting a hybrid transmission path, there occurs a wavelength dispersion of −117 ps/nm so that one of light pulses of adjacent two wavelengths is delayed from the other by 0.5 bit. Namely, after the transmission of two repeating sections, one of light pulses of adjacent two wavelengths is delayed from the other by 1 bit.

In FIG. 12 and FIG. 13, considering such a situation where light pulses of adjacent two wavelengths are about to collide with each other the 0 km point of the transmission distance, red chirping due to cross phase modulation is left in the first repeating section $6_1$ (0 km to 50 km) while blue chirping is left in the second repeating section $6_2$ (50 km to 100 km). In this case, the amount of red chirping left in the first repeating section $6_1$ becomes substantially the same as that of blue chirping left in the second repeating section $6_2$. In this way, both kinds of chirpings due to cross phase modulation to occur between adjacent two wavelengths offset to each other at every two repeating sections. In the 1 st through 9th repeating sections $6_1$ to $6_9$ adopting hybrid transmission path, both kinds of chirpings occurred in the 1 st through 8th repeating sections $6_1$ to $6_8$ offset to each other, and only the red chirping occurred in the 9th repeating section $6_9$ is left.

Further, the negative wavelength dispersion accumulated in the 1st through 9th repeating sections $6_1$ to $6_9$ is compensated for by the third optical fiber $6_c$ in the 10th repeating section $6_{10}$, so that the accumulated wavelength dispersion of the signal light propagated through the 1 st through 10th repeating sections $6_1$ to $6_{10}$ is reduced to substantially zero. Although a small amount of blue chirping is left in the 10th repeating section $6_{10}$ itself, this is compensated for by the red chirping left in the 9th repeating section $6_9$, resulting in an extremely small amount of residual chirping due to cross phase modulation. Further, adopting hybrid transmission path for the 1st through 9th repeating sections $6_1$ to $6_9$ leads to more assured compensation of wavelength dispersions and dispersion slopes and leads to realization of an optical transmission path in which nonlinear effects rarely occur.

Similarly to the above case, there is now considered such a situation where light pulses of adjacent two wavelengths are just colliding with each other at 0 km. In this case, the amount of blue chirping to be left in the first repeating section $6_1$ becomes substantially the same as that of red chirping to be left in the second repeating section $6_2$. Thus, both kinds of chirpings due to cross phase modulation are drastically reduced after the transmission of 100 km. Moreover, when light pulses of adjacent two wavelengths are on the way of collision at 0 km, there occurs an intermediate situation between the aforementioned two types of situations, resulting in the same effect with the above situations.

According to the sixth embodiment as described above, by the application of the hybrid transmission path comprising two types of optical fibers having wavelength dispersion characteristics opposite to each other, it becomes possible to compensate for wavelength dispersions and dispersion slopes more assuredly and to realize an optical transmission path in which nonlinear effects rarely occur, in addition to the effect obtained in the fourth embodiment.

In the sixth embodiment, the wavelength dispersion management has been conducted by setting two repeating sections as a basic unit. However, it is also possible to conduct the wavelength dispersion management by setting three or more repeating sections as a unit, even in a situation adopting the hybrid transmission path.

Figure 14:
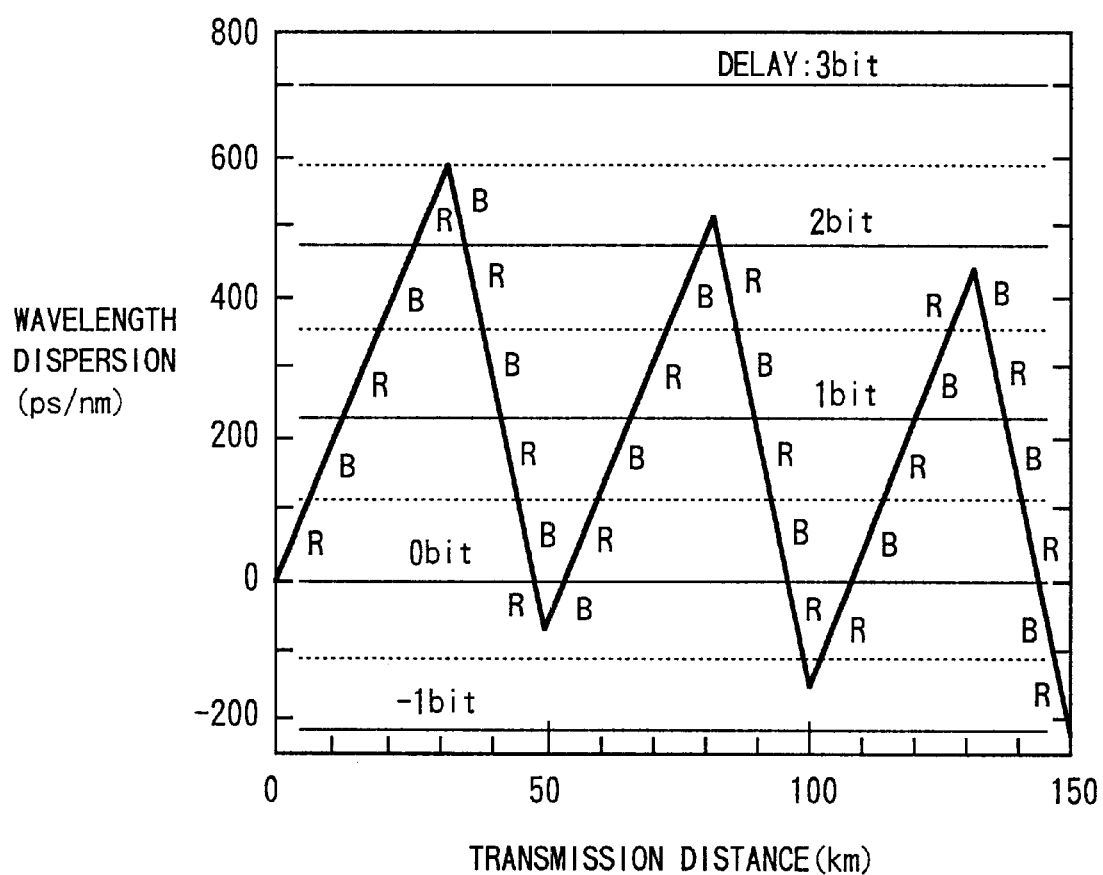
FIG. 14 is a view showing an example of a wavelength dispersion map in a situation where three repeating sections adopting a hybrid transmission path are treated as a unit, concerning the sixth embodiment.
Figure 15A:
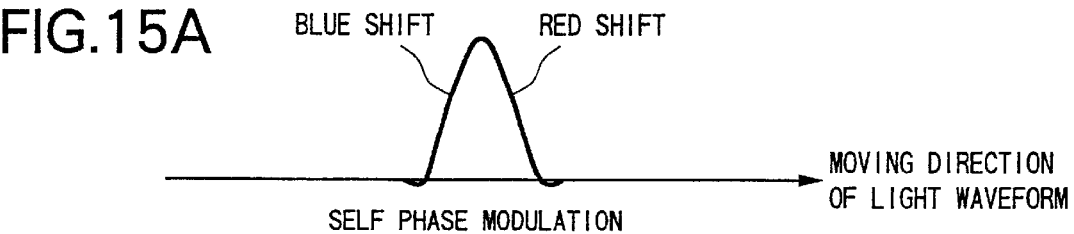
FIG. 15 is a view for explaining phase fluctuations due to self phase modulation and cross phase modulation, respectively.
Figure 15B:
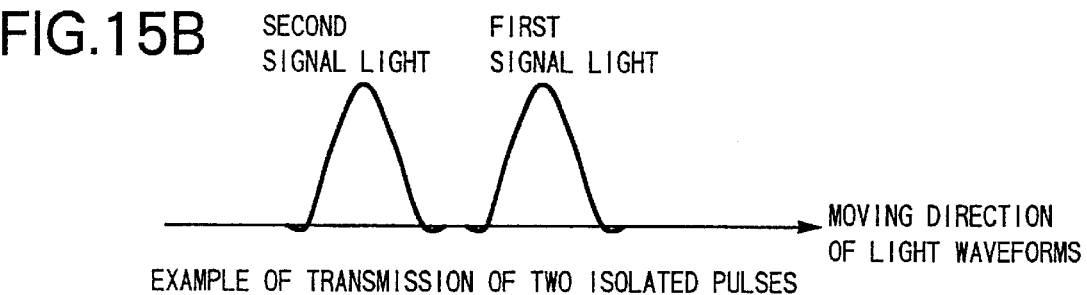
Figure 15C:
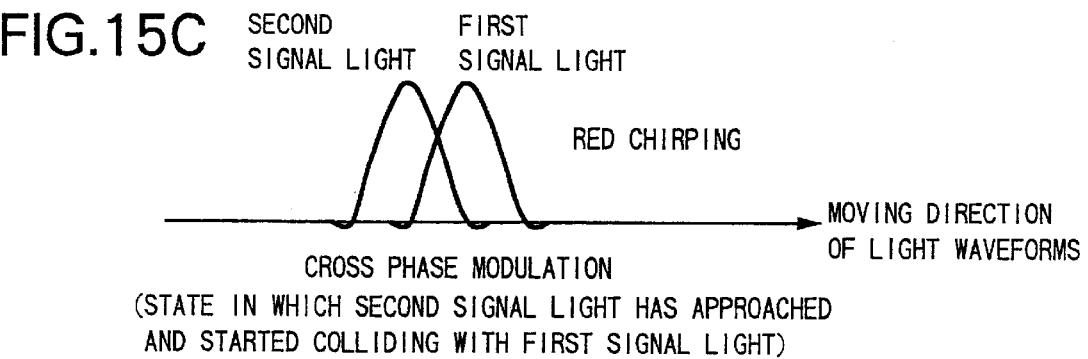
Figure 15D:
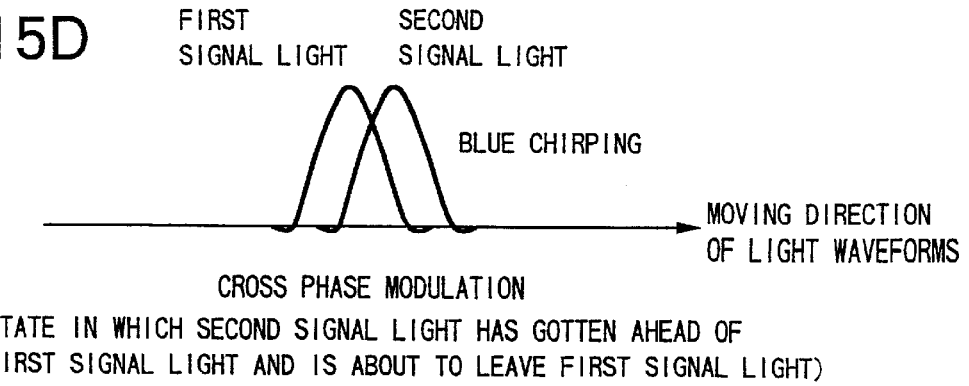

FIG. 14 is a view showing an example of a wavelength dispersion map in a situation where exemplary three repeating sections adopting a hybrid transmission path are set as a unit. It is noted here that the first optical fiber $6_a$ has a wavelength dispersion of +17.6 ps/nm/km near the signal light and a length of 33.3 km, and the second optical fiber $6_b$ has a wavelength dispersion of −39.7 ps/nm/km near the signal light and a length of 16.7 km. The setting conditions other than the above are identical with those in the sixth embodiment, i.e., the repeating interval is 50 km, the wavelength interval of signal lights is 50 GHz, and the transmission rate is 10.664 Gbit/s (bit interval of 93.77 ps). Under such setting conditions, there occurs a wavelength dispersion of −78 ps/nm after the transmission of one repeating section, so that one of light pulses of adjacent two wavelengths is delayed from the other by 0.33 bit. Namely, one of light pulses of adjacent two wavelengths is delayed from the other by 1 bit after the transmission of three repeating sections. In this way, both kinds of chirpings due to cross phase modulation to occur between signal lights of adjacent two wavelengths and between two signal lights separated by another wavelength interval therebetween, respectively, are compensated for each other, resulting in drastic reduction of such chirpings.

What is claimed is:

1. A wavelength dispersion compensating method for a transmission path for transmitting wavelength division multiplexed signal light including two or more optical signals of different wavelengths, comprising the steps of:

dividing said transmission path into a plurality of repeating sections; and setting the amount or amounts of wavelength dispersion in one repeating section or multiple repeating sections in said transmission path, to be such a value or values that the amount of blue chirping and the amount of red chirping due to cross phase modulation to occur at least between light signals of adjacent two wavelengths are substantially compensated for each other.

2. A wavelength dispersion compensating method of claim 1, wherein the compensation of wavelength dispersion is conducted such that blue chirping and red chirping occur once, respectively, in multiple repeating sections in said transmission path.

3. A wavelength dispersion compensating method of claim 1, wherein said transmission path attenuates light corresponding to a transmission distance of the light;

wherein optical amplifiers for amplifying the light attenuated in said transmission path are provided between said respective repeating sections; and wherein the compensation of wavelength dispersion is conducted such that the amount of blue chirping and the amount of red chirping due to cross phase modulation to occur between light signals of adjacent two wavelengths offset to each other, in multiple repeating sections in said transmission path.

4. A wavelength dispersion compensating method of claim 1, wherein said transmission path attenuates light corresponding to a transmission distance of the light;

wherein optical amplifiers for amplifying the light attenuated in said transmission path are provided between said respective repeating sections; and wherein, when the amount of blue chirping and the amount of red chirping due to cross phase modulation to occur between light signals of adjacent two wavelengths are set to offset to each other in one repeating section in said transmission path, the compensation of wavelength dispersion is conducted such that a plurality of cycles of occurrences of blue chirping and red chirping are provided.

5. A wavelength dispersion compensating method of claim 1, wherein said transmission path itself is capable of distributively amplifying the light being transmitted therethrough along a longitudinal direction thereof, so as to avoid the attenuation of light corresponding to the transmission distance thereof; and wherein, when the amount of blue chirping and the amount of red chirping due to cross phase modulation to occur between light signals of adjacent two wavelengths are set to offset to each other in one repeating section in said transmission path, the compensation of wavelength dispersion is conducted such that blue chirping and red chirping occur once, respectively, in said one repeating section.

6. A wavelength dispersion compensating method of claim 1, wherein said transmission path comprises an optical fiber having a positive value of wavelength dispersion and an optical fiber having a negative value of wavelength dispersion.

7. A wavelength dispersion compensating method for a transmission path for transmitting wavelength division multiplexed signal light including two or more optical signals of different wavelengths, comprising the steps of:

dividing the transmission path into a plurality of repeating sections;

providing optical amplifiers between said respective repeating sections, for compensating for losses to be caused in said transmission path;

controlling the time delay amount between signal lights of adjacent two wavelengths to be caused by wavelength dispersion in one repeating section within said transmission path, to be smaller or greater than the bit interval at the transmission rate of said wavelength division multiplexed signal light; and conducting the compensation of wavelength dispersion such that the amount of blue chirping and the amount of red chirping due to cross phase modulation to occur between light signals of adjacent two wavelengths, in one repeating section or multiple repeating sections in said transmission path, offset to each other.

8. An optical transmission system including a transmission path for transmitting wavelength division multiplexed signal light including two or more optical signals of different wavelengths, wherein said transmission path includes a plurality of repeating sections, and wherein the amount or amounts of wavelength dispersion in one repeating section or multiple repeating sections in said transmission path, is/are set to be such a value or values that the amount of blue chirping and the amount of red chirping due to cross phase modulation to occur at least between light signals of adjacent two wavelengths substantially offset to each other.

9. An optical transmission system of claim 8, wherein said transmission path is set to have such a wavelength dispersion amount that blue chirping and red chirping occur once, respectively, in said multiple repeating sections in said transmission path.

10. An optical transmission system of claim 8, wherein said transmission path attenuates light corresponding to a transmission distance of the light;

wherein optical amplifiers for amplifying the light attenuated in said transmission path are provided between said respective repeating sections; and wherein said transmission path is set to have such a wavelength dispersion amount that the amount of blue chirping and the amount of red chirping due to cross phase modulation to occur between light signals of adjacent two wavelengths offset to each other, in multiple repeating sections in said transmission path.

11. An optical transmission system of claim 8, wherein said transmission path attenuates light corresponding to a transmission distance of the light;

wherein optical amplifiers for amplifying the light attenuated in said transmission path are provided between said respective repeating sections; and wherein, when the amount of blue chirping and the amount of red chirping due to cross phase modulation to occur between light signals of adjacent two wavelengths are set to offset to each other in one repeating section in said transmission path, said transmission path is set to have such a wavelength dispersion amount that a plurality of cycles of occurrences of blue chirping and red chirping are provided.

12. An optical transmission system of claim 8, wherein said transmission path itself is capable of distributively amplifying the light being transmitted therethrough along a longitudinal direction thereof, so as to avoid the attenuation of light corresponding to the transmission distance thereof; and wherein, when the amount of blue chirping and the amount of red chirping due to cross phase modulation to occur between light signals of adjacent two wavelengths are set to offset to each other in one repeating section in said transmission path, said transmission path is set to have such a wavelength dispersion amount that blue chirping and red chirping occur once, respectively, in said one repeating section.

13. An optical transmission system of claim 8, wherein said transmission path comprises an optical fiber having a positive value of wavelength dispersion and an optical fiber having a negative value of wavelength dispersion.

14. An optical transmission system including a transmission path for transmitting wavelength division multiplexed signal light including two or more optical signals of different wavelengths, wherein said transmission path includes a plurality of repeating sections, and wherein a plurality of optical amplifiers are provided between said respective repeating sections, for compensating for losses to occur in said transmission path; and wherein said transmission path is set to have such a wavelength dispersion amount that the time delay amount between signal lights of adjacent two wavelengths to be caused by wavelength dispersion in one repeating section in said transmission path, is controlled to be smaller or greater than the bit interval at the transmission rate of said wavelength division multiplexed signal light, so that the amount of blue chirping and the amount of red chirping due to cross phase modulation to occur between light signals of adjacent two wavelengths offset to each other, in one repeating section or multiple repeating sections in said transmission path.

* * * * *